(12) United States Patent
Lukovic et al.

(10) Patent No.: US 10,740,668 B2
(45) Date of Patent: Aug. 11, 2020

(54) MULTIPLY POLYMER COMPOSITE DEVICE WITH ENCLOSED COMPONENTS, METHOD FOR PRODUCING MULTIPLY POLYMER COMPOSITE DEVICES WITH ENCLOSED COMPONENTS AND DEVICE FOR PRODUCING MULTIPLY POLYMER COMPOSITE DEVICES WITH ENCLOSED COMPONENTS

(71) Applicant: Muehlbauer GmbH & Co. KG, Roding (DE)

(72) Inventors: Vidoje Lukovic, Roding (DE); Anton Brunner, Bad Koetzting (DE); Martin Ederer, Poesing (DE)

(73) Assignee: Muehlbauer GMBH & Co. KG, Roding (DE)

( * ) Notice: Subject to any disclaimer, the term of this patent is extended or adjusted under 35 U.S.C. 154(b) by 0 days.

(21) Appl. No.: 16/622,716

(22) PCT Filed: Jun. 4, 2018

(86) PCT No.: PCT/EP2018/064583
§ 371 (c)(1),
(2) Date: Dec. 13, 2019

(87) PCT Pub. No.: WO2018/228838
PCT Pub. Date: Dec. 20, 2018

(65) Prior Publication Data
US 2020/0125912 A1 Apr. 23, 2020

(30) Foreign Application Priority Data

Jun. 13, 2017 (DE) ........................ 10 2017 005 609

(51) Int. Cl.
*G06K 19/077* (2006.01)
*B32B 27/28* (2006.01)
(Continued)

(52) U.S. Cl.
CPC ........ *G06K 19/07722* (2013.01); *B32B 27/28* (2013.01); *B32B 37/0053* (2013.01);
(Continued)

(58) Field of Classification Search
None
See application file for complete search history.

(56) References Cited

FOREIGN PATENT DOCUMENTS

DE 195 33 983 A1 4/1997
DE 19533983 A1 4/1997
(Continued)

OTHER PUBLICATIONS

XP-002782881 (VICAT-Erweichungstemperaturen); http://wiki.polymerservice-merseburg.de/index.php/Vicat-Erweichungstemperatur. Jul. 9, 2018.
(Continued)

*Primary Examiner* — Kristy A Haupt
(74) *Attorney, Agent, or Firm* — Shumaker, Loop & Kendrick, LLP; John A. Miller

(57) ABSTRACT

A polymer composite device comprises a first thermoplastic covering layer of a polymer material with a first softening temperature and a second thermoplastic covering layer of a polymer material with a second softening temperature. The polymer composite device also comprises a carrier layer, which is arranged between the first covering layer and the second covering layer. An inner layer, which comprises at least a first thermoplastic inner layer ply of a polymer material with a third softening temperature, is arranged between the first covering layer and the second covering layer. The inner layer at least partially surrounds the carrier layer in a material-bonding manner. The third softening temperature is lower than the first softening temperature and lower than the second softening temperature.

15 Claims, 5 Drawing Sheets

(51) Int. Cl.
*B32B 37/00* (2006.01)
*B32B 37/06* (2006.01)
*B32B 37/10* (2006.01)
*G06K 19/07* (2006.01)

(52) U.S. Cl.
CPC .............. *B32B 37/06* (2013.01); *B32B 37/10* (2013.01); *G06K 19/0718* (2013.01); *B32B 2305/347* (2013.01); *B32B 2307/20* (2013.01); *B32B 2307/30* (2013.01); *B32B 2307/412* (2013.01); *B32B 2425/00* (2013.01)

(56) References Cited

FOREIGN PATENT DOCUMENTS

| | | |
|---|---|---|
| DE | 10 2009 060 862 A1 | 7/2011 |
| DE | 102009060862 A1 | 7/2011 |
| DE | 102015205081 A1 | 9/2016 |
| DE | 10 2015 222 364 A1 | 5/2017 |
| DE | 102015222364 A1 | 5/2017 |
| EP | 1 609 597 A2 | 12/2005 |
| EP | 1609597 A2 | 12/2005 |
| EP | 2 085 914 A1 | 8/2009 |
| EP | 2085914 A1 | 8/2009 |
| EP | 2 596 905 A1 | 5/2013 |
| EP | 2596905 A1 | 5/2013 |
| WO | 2013/085723 A1 | 6/2013 |
| WO | 2013085723 A1 | 6/2013 |
| WO | 2014/149926 A1 | 9/2014 |
| WO | 2014149926 A1 | 9/2014 |

OTHER PUBLICATIONS

XP-002782881, Gefunden im Internet: URL:http://wiki.polymerservice-merseburg.de/index.php/Vicat-Erweichungstempatur [gefunden am Jul. 9, 2018].

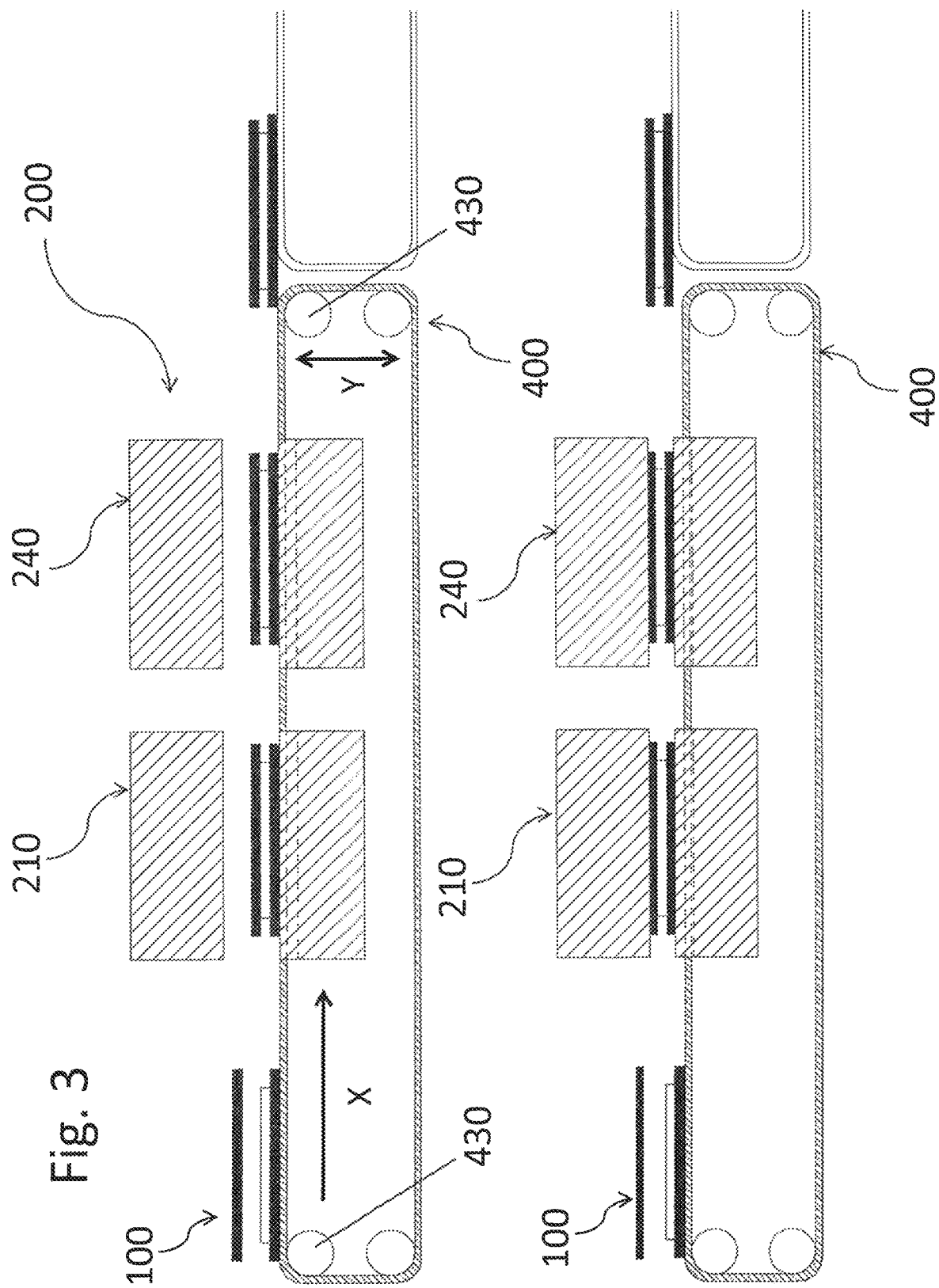

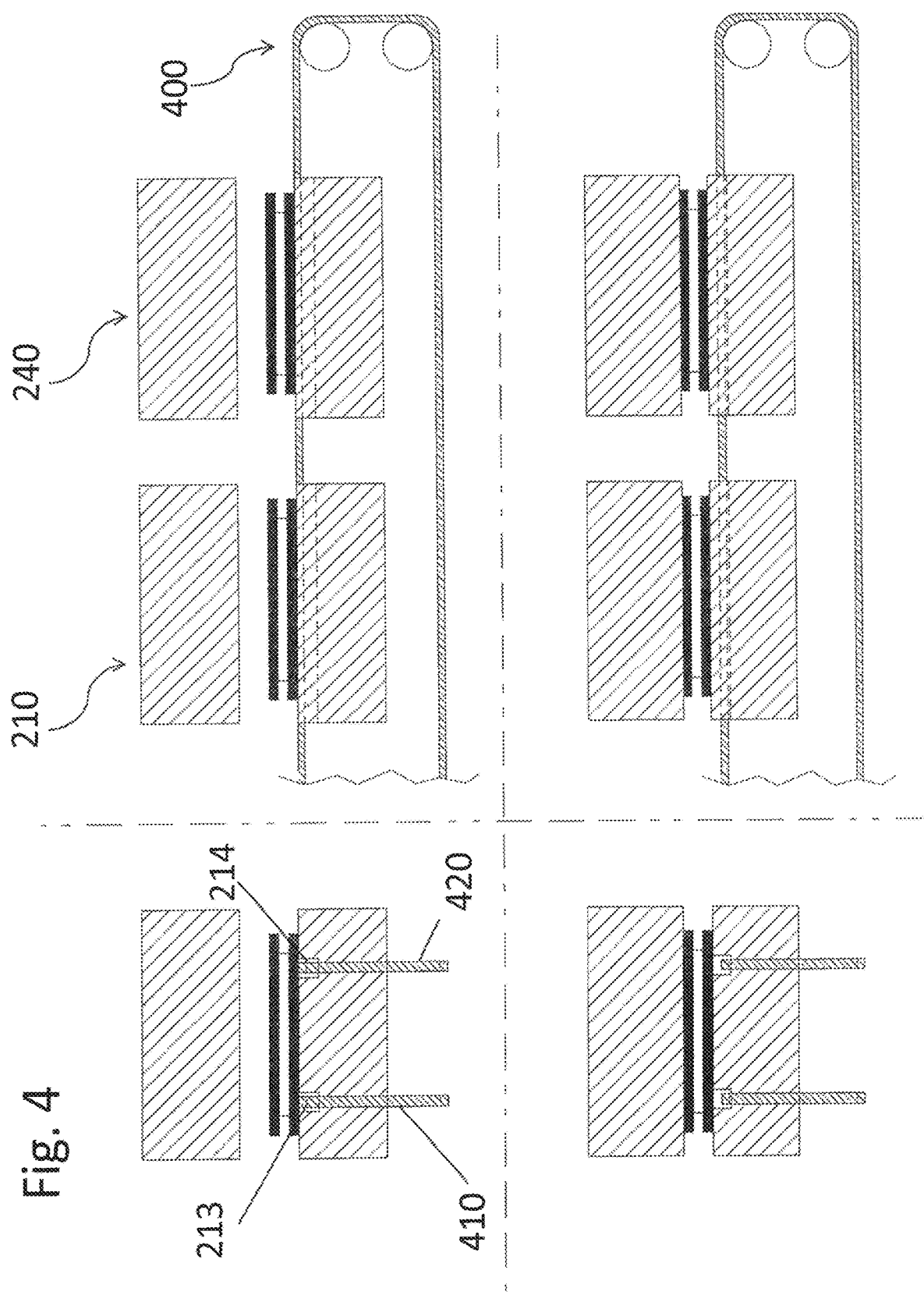

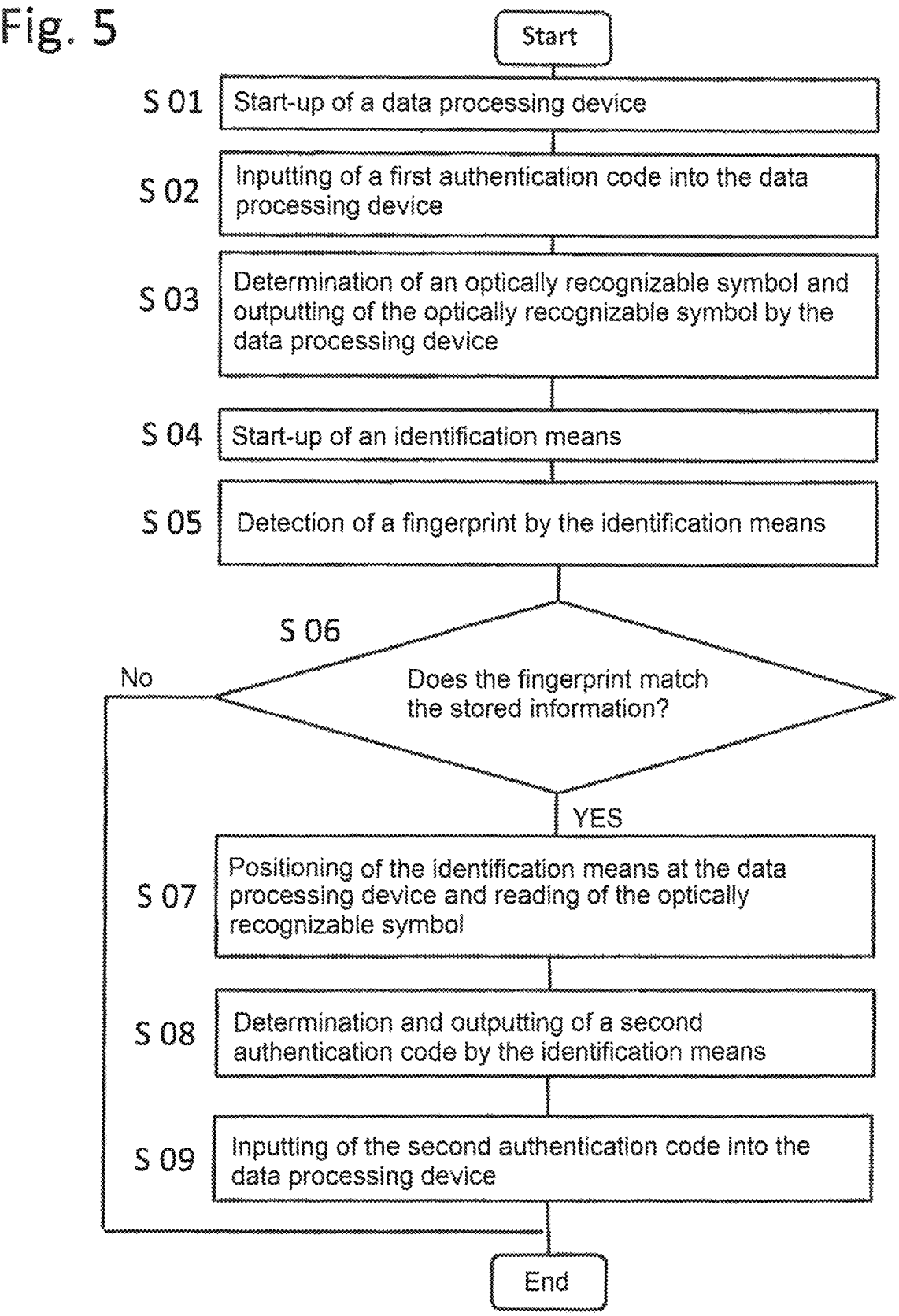

MULTIPLY POLYMER COMPOSITE DEVICE WITH ENCLOSED COMPONENTS, METHOD FOR PRODUCING MULTIPLY POLYMER COMPOSITE DEVICES WITH ENCLOSED COMPONENTS AND DEVICE FOR PRODUCING MULTIPLY POLYMER COMPOSITE DEVICES WITH ENCLOSED COMPONENTS

CROSS-REFERENCE TO RELATED APPLICATIONS

This application is a National Stage application of International Application No. PCT/EP2018/064583 filed Jun. 4, 2018, which claims priority to German Patent Application Serial No. DE 10 2017 005 609.9, filed Jun. 13, 2017.

BACKGROUND

Field

There are described herein a multiply polymer composite device with enclosed components and a method for producing multiply polymer composite devices with enclosed components. There are further described a device for producing multiply polymer composite devices and also an authentication process, wherein the authentication process uses, for example, an identification means which comprises a multiply polymer composite device with enclosed components.

DISCUSSION

The polymer composite devices described herein can have, for example, a bank card format, for example according to ISO/IEC 7810.

Multiply polymer composite devices with enclosed components, for example so-called display cards, are known as belonging to the prior art. The enclosed components (batteries, display elements, sensors, etc.) have a spatial extent. However, a flat surface of the polymer composite devices, for example of the display cards, both on the front side and on the rear side is desirable in most applications. It is therefore necessary to compensate for the spatial extent of the enclosed components. Voids or gas inclusions in the polymer composite devices, which could adversely affect the durability and the mechanical resilience of the polymer composite devices, are undesirable.

At the same time, conventional hot lamination methods are unsuitable or scarcely suitable for the production of multiply polymer composite devices with enclosed components, because the high temperatures and pressures required therefor can damage the components that are enclosed or are to be enclosed.

A known possibility for implementing multiply polymer composite devices having flat surfaces is to adapt the individual plies of the polymer composite device to the geometry of the components that are enclosed or are to be enclosed. For example, recesses which correspond to the geometry of the components to be enclosed can be introduced into the individual plies by a stamping method, so that the spatial extent of the components is compensated for and the polymer composite device has flat surfaces.

However, exact stamping of the recesses, each of which corresponds to the geometry of the components to be enclosed, is very complex, in particular where a large number of components is to be enclosed, and requires high precision of the stamping method.

A known further development of this manufacturing method provides that the individual plies of the polymer composite device are provided with recesses which are suitable for compensating for the spatial extent of the components but are adapted only approximately to the geometry of the individual components. In order to avoid the formation of voids, which in particular adversely affect the mechanical resilience of the polymer composite devices, a filling or adhesive material is introduced into the recesses. This filling or adhesive material is suitable for liquefying during the manufacture of the polymer composite devices and thereby enclosing and fixing the components. The softening point of the filling or adhesive material is below a temperature threshold above which damage to the components is to be expected.

EP 2 596 950 B1 discloses a method for producing film composite materials with enclosed components. The extent of components to be enclosed is thereby compensated for by recesses in the film composite material. In order to avoid voids, a balancing material is introduced into the film composite material, the balancing material having a lower softening point than the surrounding film composite material. The balancing material can be, for example, a thermally activatable adhesive material. If the film composite material is heated above the softening point of the balancing material in the course of manufacture, the balancing material flows around the enclosed components and fixes them.

EP 2 085 914 B1 discloses a polymer card and a method for the production thereof. The polymer card comprises a module or display element which is surrounded by an adhesive layer. The adhesive layer thereby flows around the module or the display element and is thermally curable.

A disadvantage of the known polymer composite devices, or of the associated manufacturing methods, is that voids cannot be completely avoided, for example because of a lack of filling material in the recesses. Furthermore, it is still necessary to manufacture recesses, even if they correspond only approximately to the geometries of the electronic components to be received. This increases the outlay for manufacture of the polymer composite device considerably.

A further disadvantage of the known polymer composite devices, or of the associated manufacturing methods, is complex and difficult temperature management during the manufacturing process. In particular when heating a filling or adhesive material which is distributed unevenly and over different plies of the polymer composite device, uniform thermal activation of the filling or adhesive material is difficult. On the one hand, portions of the filling or adhesive material are located in different layers; on the other hand, the surrounding polymer material, which has a higher softening point than the filling or adhesive material, acts as a heat insulator.

A known application of polymer composite devices, in particular of polymer cards, is the authentication of a user of a data processing device, for example of a home computer within the context of online banking.

The user thereby identifies himself to the data processing device by means of an authentication code which is known to him (personal identification number (PIN)). In order to ensure the integrity of certain transactions of the user to the data processing device, for example the enabling of financial transactions, a second transaction-dependent authentication code (transaction number (TAN)) is necessary. This is determined by a central data processing device, for example a bank server, and transmitted to the data processing device. In order that the user is able to see the second authentication code, he requires a special peripheral device into which he inserts a polymer card allocated to him and inputs a card-specific third authentication code. The peripheral device connected to the computer then displays the transaction-dependent second authentication code, which is then inputted into the data processing device by the user in order to enable a transaction.

A disadvantage of this authentication process is that the user must input three authentication codes, and the duration of the authentication and the user-friendliness are therefore adversely affected.

SUMMARY

Despite existing solutions, there is a continued need for an improved polymer composite device with enclosed components.

The problem is, therefore, to provide an improved multiply polymer composite device with enclosed components.

In addition, an associated manufacturing method and an associated manufacturing device for the improved multiply polymer composite device are to be provided.

The manufacture of the polymer composite device is to be facilitated, the number of necessary working steps is to be reduced and/or simplified, and the number of required components is to be reduced.

There is further to be provided an improved authentication process which uses, for example, the improved polymer composite device.

This problem is solved by a multiply polymer composite device as claimed in claim 1, a production method as claimed in claim 8, a device for producing a multiply polymer composite device as claimed in claim 12, and an authentication process as claimed in claim 15.

Advantageous embodiments are defined by the dependent claims.

A polymer composite device comprises a first thermoplastic covering layer of a polymer material with a first softening temperature and a second thermoplastic covering layer of a polymer material with a second softening temperature. The polymer composite device further comprises a carrier layer which is arranged between the first covering layer and the second covering layer. An inner layer, which comprises at least a first thermoplastic inner layer ply of a polymer material with a third softening temperature, is arranged between the first covering layer and the second covering layer. The inner layer at least partially surrounds the carrier layer in a material-bonding manner. The third softening temperature is lower than the first softening temperature and lower than the second softening temperature.

An advantage of the polymer composite device is that the at least one inner layer ply already softens/liquefies at the third softening temperature on heating of the polymer composite device, while the two covering layers remain dimensionally stable at least up to a first and/or second softening temperature. The at least one inner layer ply of polymer material molds around/encloses the carrier layer, which in particular can comprise electronic components, located between the covering layers. The inner layer ply thus does not have to be, or must only be largely, adapted to the geometry of the carrier layer and/or of the components located on the carrier layer. Furthermore, it is not necessary to introduce an additional filling or adhesive material into the polymer composite device. As a result, the temperature management in a manufacturing process is simplified, because only the softening temperatures of the at least one inner layer ply and of the covering layers have to be taken into consideration, whereby the softening temperatures of the two covering layers can be identical. Uniform heating of the at least one inner layer ply is desirable, but not absolutely essential, because manufacturing and/or processing inaccuracies are compensated for by the softening/liquefaction of the at least one inner layer ply. The at least one softened and/or liquefied inner layer ply can solidify again after the temperature of the polymer composite device has fallen and establish a fixed and/or material-bonding and/or adhesive connection with the carrier layer and/or with at least one of the covering layers.

The manufacturing process can thus be simplified and/or accelerated.

The polymer composite device can comprise at least one display device which is arranged between the first covering layer and the second covering layer. In particular, the display device can be arranged on the carrier layer.

The display device can be, for example, a PLCD or LCD display. In particular, the display device can be an electronic paper (e-paper display). A display brightness of the display device can be variably adjustable.

Advantages of an electronic paper are, for example, that it can be manufactured in a particularly space-saving manner, or with a small display thickness, and that the electronic paper is flexible, so that it is not damaged at least in the case of a limited deformation of the polymer composite device. Furthermore, an electronic paper requires only comparatively small amounts of energy to display optically recognizable symbols, so that an energy supply, or a space requirement for an energy supply, for example for a battery, can be reduced.

The first covering layer and/or the second covering layer can comprise, in particular in the region of the display device, at least one partially transparent and/or scratch-resistant portion, so that at least part of the at least one display device is optically recognizable/readable for an observer and/or an electronic reader.

The first and/or the second covering layer and/or a partially transparent region of the first and/or the second covering layer can have a matte or a glossy surface.

Embodiments of the polymer composite device are possible which comprise a first and/or second covering layer, each of which comprise a plurality of (part) polymer materials with different softening temperatures. In these embodiments, the first or the second softening temperature is in each case the softening temperature of the (part) material with the lowest softening temperature.

Furthermore, the at least one thermoplastic inner layer ply can be at least partially transparent at least in the region of the display device.

Embodiments of the polymer composite device are possible which comprise an inner layer which comprises at least one inner layer ply which consists of a plurality of polymer materials with different softening temperatures. In these embodiments, the third softening temperature is the softening temperature of the material with the lowest softening temperature.

In one embodiment, the multiply polymer composite device comprises at least a first, in particular rechargeable, battery/a first accumulator. The multiply polymer composite device can further comprise a first overheat protection and/or a second overheat protection. The first and/or the second overheat protection can each comprise polymer materials whose softening temperatures are higher than the third softening temperature. The first and/or the second overheat protection can each consist in part or completely of polymer materials, in particular of polycarbonate. In other embodiments, the first and/or the second overheat protection can consist in part or completely of further materials, for example of silicon dioxide.

The first overheat protection can be arranged between the first battery and the first covering layer, in particular lying against a surface of the first battery that faces towards the first covering layer.

Alternatively or in addition, the first overheat protection can also be arranged between the at least one display device and the first covering layer, in particular lying against a surface of the display device that faces towards the first covering layer.

The second overheat protection can be arranged between the first battery and the second covering layer, in particular lying against a surface of the first battery that faces towards the second covering layer.

Alternatively or in addition, the second overheat protection can also be arranged between the at least one display device and the second covering layer, in particular lying against a surface of the display device that faces towards the second covering layer.

The first and/or the second overheat protection can be so configured and arranged that they cover/protect against overheating both the first battery and the at least one display device and/or further components at the same time.

The first and/or the second overheat protection can cover/protect against overheating a plurality of electronic components.

An advantage of the use of one or more overheat protections is that it protects elements that are particularly sensitive to heat, for example the display device or the first battery. By means of an overheat protection it is possible to protect against overheating in particular those elements that are positioned nearest to one of the covering layers. Heat supplied to the polymer composite device from outside thus does not reach the heat-sensitive elements, or reaches them to only a reduced degree and/or with a time delay, while the at least one inner layer ply is softened/liquefied. In addition, the first and/or the second overheat protection provides additional protection for sensitive components from high pressures or pressure peaks, as can occur, for example, during lamination.

A further advantage of the first and/or second overheat protection is that deformation of heat- and/or pressure-sensitive components can be prevented or at least reduced. Display devices of electronic paper, for example, can develop curves or wave-like surface structures at high temperatures, as can occur, for example, during lamination operations. Such a deformation can be at least partially prevented by the first and/or the second overheat protection.

The first and/or the second overheat protection can be transparent.

The inner layer of the multiply polymer composite device can comprise a second thermoplastic, in particular transparent, inner layer ply, wherein the softening temperature of the second thermoplastic inner layer ply is the same as or lower than the third softening temperature.

The inner layer of the multiply polymer composite device can further comprise a third, a fourth, a fifth and/or a sixth thermoplastic, in particular transparent, inner layer ply, wherein the softening temperature of the third, fourth, fifth and/or sixth thermoplastic inner layer ply is in each case the same as or lower than the third softening temperature. The inner layer of the multiply polymer composite device can comprise a plurality of, in particular transparent, inner layer plies, wherein the softening temperatures of the inner layer plies are in each case lower than or equal to the third softening temperature. The softening temperatures of the inner layer plies can be identical to or different from one another. The optical properties of the inner layer plies can be different from one another.

An advantage of implementing a plurality of inner layer plies which together form the inner layer is that it is possible to completely surround the carrier layer and/or further elements with the inner layer. The fixing and/or the material-bonding enclosure of the carrier layer with polymer material can thus be improved.

The multiply polymer composite device can comprise a second, in particular rechargeable, battery/a second accumulator. The second battery/the second accumulator can be protected by the first and/or the second overheat protection. Furthermore, it is possible to protect a first electronic component, for example the first battery, by the first and/or the second overheat protection and a second electronic component, for example the second battery, by a third and/or fourth overheat protection. The number of overheat protection devices or measures can correspond to the number of electronic components that are to be protected.

The multiply polymer composite device can further comprise electronic components, in particular semiconductor components. The components can form an electronic circuit. The components can be arranged on the carrier layer. Furthermore, the components can be manufactured by a printing process. The carrier layer can be a printed circuit board (PCB).

In addition, the polymer composite device can further comprise magnetic strips, antennas, chips, activation or operating state indicators and/or charging status indicators of the first and/or of the second battery. The activation or operating state indicator(s) and/or the charging status indicator(s) can be in the form of, for example, LED indicators, in particular multicolored LED indicators.

In one embodiment, the multiply polymer composite device can comprise a fingerprint sensor which is configured and arranged to detect and/or to store a fingerprint.

An advantage of a fingerprint sensor is that authentication of a person is made possible. For example, the electronic circuit can store information about a fingerprint and compare it with a fingerprint detected by the fingerprint sensor. Depending on the result of the comparison, further processes can be carried out or inhibited by the electronic circuit.

In a variant, the multiply polymer composite device can comprise an induction coil which is suitable for receiving wirelessly transmitted energy. The ends of the induction coil can each be connected to charging contacts of the first and/or the second rechargeable battery/accumulator, so that recharging of the first and/or the second battery/accumulator is possible by wireless inductive energy transfer.

Alternatively or in addition, recharging of the first and/or the second battery/accumulator can be made possible by charging contacts which are each connected to the battery/accumulator, wherein the charging contacts are so arranged that they allow the battery/accumulator to be charged by an external energy supply. The charging contacts are not completely enclosed by the polymer composite device.

Optionally, an additional contact protector or stopper of polycarbonate can isolate an external exposed part of the charging contacts from the thermoplastic inner layer ply/plies. The contact protector or stopper can be arranged between the covering layers, preferably in such a manner that it is not visible to an observer of the polymer composite device.

An advantage of the contact protector or stopper is that the exposed external contacts are thermally isolated from the thermoplastic inner ply/plies. As a result, it is possible in particular to prevent the thermoplastic inner layer ply/plies from being melted by heat given off by the charging contacts during charging of the battery/accumulator.

Furthermore, the contact protector or stopper can also protect the exposed part of the charging contacts during lamination, because it forms a temperature-resistant barrier for the inner layer plies, which in particular during the lamination process are melted. Contamination and/or covering of the charging contacts by the melted inner layer plies during lamination can thereby be prevented or at least reduced.

In one embodiment, the multiply polymer composite device comprises at least one on/off button which is preferably surrounded by an in particular annular spacer element. In other embodiments, the spacer element can also have the contours of a polygonal frame or can be partially annular. The terms "annular", "partially annular" and "contours of a polygonal frame" here refer to a cross-section of the spacer element, or to a plan view of the polymer composite device from the perspective of an observer. In the case of an "annular" spacer element, the body of the spacer element can also be described as, for example, a hollow cylinder. The spacer element can comprise manufacturing materials from the group of the metals and/or plastics materials, in particular the silicones.

The spacer element can protrude beyond the on/off button in the direction from the second covering layer to the first covering layer or in the direction from the first covering layer to the second covering layer. In particular, the spacer element can be suitable for preventing compressive forces on the on/off button during lamination.

The at least one on/off button and/or the spacer element can be arranged between the first covering layer and the second covering layer, in particular on the carrier layer. Both the on/off button and the spacer element can either penetrate the first or the second covering layer or be covered by the first or second covering layer. If the on/off button is covered by the first or second covering layer, the first or second covering layer spans the on/off button in a resilient manner.

The on/off button can be configured for haptic activation by a user. In particular, the on/off button can be a button which is resiliently spanned and/or visually concealed by a covering layer and which can be operated/activated by a user of the polymer composite device by the exertion of physical pressure on the polymer composite device in the region of the on/off button. Alternatively, the on/off button can also be a button which penetrates a covering layer and/or is visually discernible and which can be operated/activated by a user of the polymer composite device by the exertion of physical pressure.

The on/off button can be configured for starting up and/or ending operation of the electronic circuit and/or the display device. Alternatively or in addition, the on/off button can serve in other embodiments for controlling further elements of the polymer composite device.

In a further development, the multiply polymer composite device can comprise a plurality of buttons for controlling device elements of the polymer composite device.

In one embodiment, the multiply polymer composite device can comprise an optical sensor which is arranged and configured to detect an optically recognizable symbol. The optical sensor and/or the electronic circuit can be arranged and configured to compare the detected optically recognizable symbols with stored information and/or to electronically process them.

The optical sensor and/or the electronic circuit can be arranged and configured to transmit the detected optically recognizable symbols and/or information determined on the basis of the detected optically recognizable symbols to the display device.

Optionally, the polymer composite device can additionally comprise a light sensor. A display brightness of the display device can be adjusted in dependence on the ambient brightness detected by the light sensor.

In a variant, the optical sensor is positioned on the side of the carrier layer that faces away from the display device. Likewise, the light sensor and/or the external exposed parts of the charging contacts can be positioned on the side of the carrier layer that faces away from the display device.

A method for producing a polymer composite device comprises the steps:

providing a first thermoplastic covering layer of a polymer material with a first softening temperature, providing a second thermoplastic covering layer of a polymer material with a second softening temperature, providing a carrier layer, providing an inner layer which comprises at least a first inner layer ply of a polymer material with a third softening temperature, wherein the third softening temperature is lower than the first softening temperature and lower than the second softening temperature, arranging the carrier layer and the inner layer between the first covering layer and the second covering layer, wherein the inner layer at least partially molds around/surrounds/encloses the carrier layer, exerting a pressing force on at least one of the covering layers, so that the first covering layer and the second covering layer are pressed at least partially into contact with the inner layer, heating the layers pressed into contact to a manufacturing temperature, wherein the manufacturing temperature is at least equal to the third softening temperature and the manufacturing temperature is lower than the first softening temperature and the manufacturing temperature is lower than the second softening temperature.

The order in which the steps are carried out is not fixed. In particular, the provision of the layers can be carried out in any desired order.

The method for producing a polymer composite device can further comprise at least one of the following steps:

arranging a display device and/or a first battery between the first covering layer and the second covering layer, in particular on the carrier layer, arranging the first overheat protection between the display device and/or the first battery and the first covering layer, in particular lying against a surface of the display device and/or of the first battery that faces towards the first covering layer, arranging the second overheat protection between the display device and/or the first battery and the second covering layer, in particular lying against a surface of the display device and/or of the first battery that faces towards the second covering layer, cooling the layers to a temperature which is lower than the third softening temperature, releasing the pressing force.

The order in which the steps are carried out is not fixed.

Furthermore, prior to the described method steps for producing a polymer composite device, electronic components, in particular semiconductor components, can be arranged on the carrier layer, in particular by a printing process.

An advantage of the method, in addition to simple process management, in particular simple temperature management, is that the required heating time overall can be reduced. In particular, an inner layer already lying directly against the covering layer can be softened/liquefied by heating. Externally supplied heat thus already reaches the material to be softened/liquefied when the first and/or the second covering layer is heated.

In the method described here, heating of the layers pressed into contact can be ended after a predetermined period of time, preferably of 60 seconds, particularly preferably of 30 seconds.

An advantage is that, as a result of the shortened heating time, elements that are sensitive to heat, for example the electronic components, are protected.

A laminating device which is suitable for producing a polymer composite device comprises at least a first thermal press, which comprises a first heatable pressing plate and a second heatable pressing plate. The pressing plates are oriented parallel to one another and together/jointly define an interior space. A first laminating plate lies, at least during the production of the polymer composite device, against the surface of the first pressing plate that faces towards the second pressing plate. A second laminating plate lies, at least during the production of the polymer composite device, against the surface of the second pressing plate that faces towards the first pressing plate. Furthermore, a first insulating inlay lies against the surface of the first laminating plate that faces towards the second pressing plate, and a second insulating inlay lies against the surface of the second laminating plate that faces towards the first pressing plate.

At least the first pressing plate is displaceable in a direction towards the second pressing plate in a manner effective for pressing, so that the first insulating inlay and the second insulating inlay can be brought into contact with a workpiece arranged in the interior space, in particular with a polymer composite device. In a further development of the laminating device, the first and/or the second pressing plate is/are displaceable in a manner effective for pressing. The first laminating plate can be heated/warmed by heating/warming the first pressing plate, and the second laminating plate can be heated/warmed by heating/warming the second pressing plate. The first insulating inlay can be heated/warmed in a time-delayed manner by heating/warming the first laminating plate, and the second insulating inlay can be heated/warmed in a time-delayed manner by heating/warming the second laminating plate.

The first and/or the second insulating inlay is/are adapted to transmit heating/warming in a time-delayed manner. Once the time delay has passed, the heat is transmitted to the workpiece, in particular to the polymer composite device, with a uniformly increasing temperature.

An advantage of such a laminating device is the improved temperature management as a result of the insulating inlays which can be warmed in a time-delayed manner. As a result of the direct contact of the insulating inlays with the workpiece, warming/heating of the workpiece takes place directly analogously to the heating of the insulating inlay.

The insulating inlays can in particular be resilient, or flexible in a predetermined range, in order not to scratch and/or damage the polymer composite device to be manufactured when they are in direct contact therewith.

In a variant of the laminating device, the first thermal press can further comprise a first heating device for heating the first pressing plate and/or a second heating device for heating the second pressing plate. In a further development, the first thermal press or a second thermal press can comprise a first cooling device for cooling the first pressing plate of the first thermal press or for cooling a first pressing plate of the second thermal press, and/or can comprise a second cooling device for cooling the second pressing plate of the first thermal press or for cooling a second pressing plate of the second thermal press.

In variants in which the laminating device comprises a second thermal press, the second thermal press can be constructed analogously to the first thermal press. In particular, the second thermal press, which in particular comprises a first and/or a second cooling device, can also comprise an arrangement of pressing plates, laminating plates and insulating inlays corresponding to the first thermal press. The insulating inlays, lying directly against the polymer composite device to be manufactured, of the second thermal press can thereby improve the temperature management on cooling of the polymer composite device, analogously to the warming of the polymer composite device by the first thermal press.

The laminating device can further comprise a transport device which is configured and arranged to convey a workpiece to be manufactured, or an arrangement of the workpiece to be manufactured and the laminating plates and/or the insulating inlays, into the interior space of the thermal press and/or to convey a workpiece, or an arrangement of the workpiece to be manufactured and the laminating plates and/or the insulating inlays, out of the interior space of the thermal press.

The transport device can be configured and arranged to move a workpiece to be manufactured, or an arrangement, in a conveying direction, and/or to be movable in a lowering direction which is substantially orthogonal to the conveying direction.

The transport device can in particular be a conveyor belt which is movable/lowerable in a direction orthogonal to a conveying direction.

In a variant, the transport device can comprise two parallel conveyor belts which can be lowered into recesses of the first and/or second thermal press which are provided and suitable therefor. The recesses are arranged in a pressing plate of the first and/or of the second thermal press.

The laminating device can comprise at least one sensor device which detects the position of the workpiece, in particular of the polymer composite device. The detection of the position of the workpiece can take place both inside and outside the interior space of the thermal press. In the case of incorrect positioning of the workpiece, a manufacturing process can be interrupted and/or the position of a workpiece can be corrected by means of a controller.

An authentication process for a user of a data processing device with an identification means comprises the steps:
  providing a data processing device which comprises an optical display device,
  providing an application program product which controls the data processing device,
  starting up the data processing device with the application program product,
  inputting a first authentication code allocated to the user into the data processing device,
  outputting a determined optically recognizable symbol by the display device of the data processing device, wherein the optically recognizable symbol is determined with the first authentication code,
  starting up the identification means, wherein the identification means stores at least one piece of fingerprint information of the user, placing a finger of the user on a fingerprint sensor of the identification means, wherein the fingerprint of the finger matches the stored fingerprint information, positioning the identification means at the optical display device of the data processing device, so that an optical sensor of the identification means detects the optically recognizable symbol outputted by the data processing device, outputting a second authentication code by a display device of the identification means, inputting the second authentication code into the data processing device, verifying the second authentication code.

An advantage of the authentication process is that the required number of authentication codes to be inputted by the user is reduced overall. A further advantage is that a special peripheral device into which the identification means must be inserted is not required.

The data processing device can be connected to one or more further data processing devices and/or to a central control unit. For example, the data processing device can be connected to a bank server. The determination of the optically recognizable symbol outputted by the data processing device can be carried out at least partially by one or more of the further data processing devices and/or by the central control unit. Verification of the second authentication code can be carried out by the data processing device and/or at least partially by one or more of the further data processing devices and/or the central control unit.

An advantage of transmitting the second authentication code by a bank server, for example, is that the security of the authentication process is increased.

The determination of the optically recognizable symbol outputted by the data processing device and/or the verification of the second authentication code can be carried out by retrieving previously stored data and/or by a computing method. For determining the optically recognizable symbol outputted by the data processing device, time information can be linked with the retrieved stored data and/or the computing method can determine the optically recognizable symbol with the time information.

In other embodiments, a random variable can be used for determining the optically recognizable symbol.

An advantage is that, by using time information and/or random variables, the optically recognizable symbols are different from one another each time the authentication process is repeated. The security of the authentication process is thereby increased.

The information contained in the optically recognizable symbol, which information is detected by the optical sensor of the identification means, can additionally be encrypted by an encryption method. The identification means can be configured to decrypt the information and, starting from the decrypted information, to determine the second authentication code. For encryption or decryption, known methods, which will not be described in greater detail here, can be used.

The enabling of predetermined control authorizations of the data processing device can be carried out for the user by the application program product in the event of successful verification of the second authentication code.

For example, a bank transaction can be enabled for execution.

Alternatively or in addition, predetermined functions of the data processing device can be blocked for the user by the application program product in the event of unsuccessful verification of the second authentication code.

This blocking can be permanent, in particular after repeated unsuccessful verification of the second authentication code.

For example, the authorization to carry out bank transactions can be permanently blocked. The security of the authentication process can thereby be increased.

BRIEF DESCRIPTION OF THE DRAWINGS

Further features, properties, advantages and possible modifications will become clear for a person skilled in the art from the following description, in which reference is made to the accompanying drawings. In the drawings, all the features which are described and/or depicted show the subject-matter disclosed herein on their own or in any desired combination. The dimensions and proportions of the components shown in the figures are not to scale.

FIG. 3, 4 show, schematically, a laminating device with a transport device.

FIG. 5 shows a program flow chart of an authentication process.

DETAILED DESCRIPTION OF THE EMBODIMENTS

Figure 1:
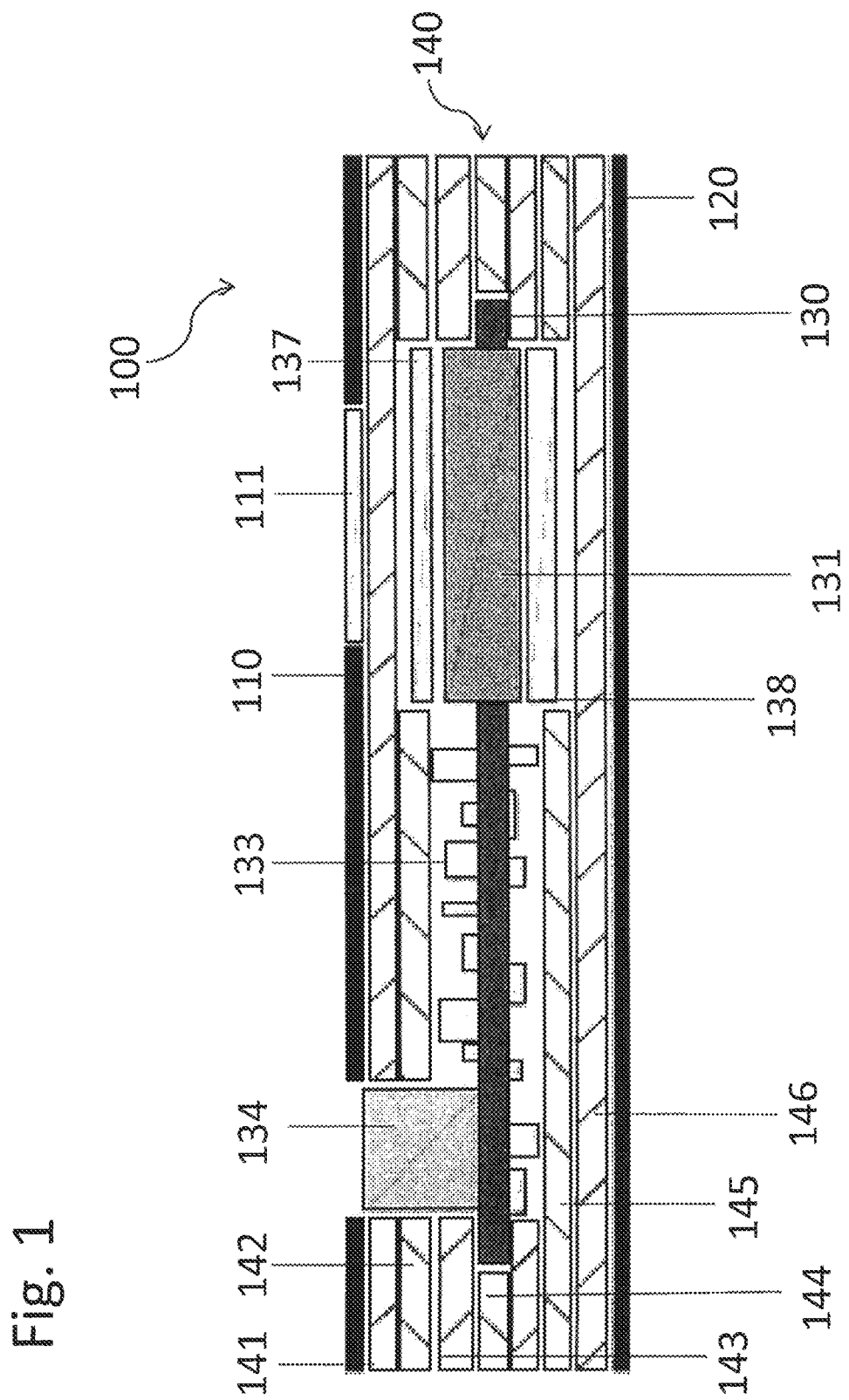
FIG. 1 shows, schematically, a polymer composite device with enclosed components.

Comparable components and features, or components and features which are the same and have the same effect, are in each case provided with the same reference numerals in the figures. In some cases, for reasons of clarity, reference numerals have also been omitted from some features and components in the figures, such features and components already being provided with reference numerals in other figures. The components and features which are not described again in relation to the further figures are similar in form and function to the corresponding components and features according to the other figures.

FIG. 1 shows a polymer composite device 100 having a first covering layer 110 and having a second covering layer 120. The first covering layer 110 and the second covering layer 120 are manufactured from a thermoplastic polymer material, in particular from polycarbonate. In the exemplary embodiment shown, the first covering layer 110 and the second covering layer 120 are manufactured from the same thermoplastic polymer material, but this is not the case in all the embodiments according to the invention.

The first covering layer 110 and the second covering layer 120 each form the outermost layers of the polymer composite device 100. Between the first covering layer 110 and the second covering layer 120 there are arranged a carrier layer 130 and an inner layer 140.

On the carrier layer 130 there is arranged a plurality of electronic components 133. There are further arranged on the carrier layer 130 a fingerprint sensor 134, a first rechargeable battery 131 and a display device. The display device is arranged and configured to display optically recognizable symbols. The carrier layer, in conjunction with the components arranged thereon, has a profile, uneven in cross-section, with raised elements. In other variants (not shown), the carrier layer 130 can comprise, for example, a second battery, an optical sensor, an on/off button and an induction coil and/or connection contacts for the first and/or second battery.

In the exemplary embodiment shown in FIG. 1, the inner layer 140 comprises six inner layer plies 141, 142, 143, 144, 145 and 146. In the exemplary embodiment shown, the six inner layer plies are manufactured from the same thermoplastic transparent polymer material, but this is not the case in all the embodiments according to the invention. The inner layer plies 141, 142, 143, 144, 145 and 146 can consist, for example, of an in particular uniform PET, PETG, ABS or PVC material.

The inner layer 140 partially surrounds the carrier layer 130 and the components arranged thereon. To that end, recesses are arranged in the first, second, third, fourth and fifth inner layer ply, which recesses are suitable for receiving the carrier layer and the components arranged on the carrier layer. In other embodiments (not shown) with only a few raised components, the implementation of recesses in one or more inner layer plies can be omitted completely.

The first covering layer 110 has a transparent and scratch-resistant portion 111 which, from the perspective of an observer of the polymer composite device 100, is arranged above the display device. The transparent portion 111 is likewise manufactured from a thermoplastic polymer material/polycarbonate. In the embodiment shown here, the portion 111 is a separate piece of film of polymer material which is inserted into the first covering layer 110. However, this is not the case in all the embodiments. The first covering layer 110 further has an opening in the region of the fingerprint sensor 134, so that the fingerprint sensor 134 is not covered by the first covering layer 110.

The fingerprint sensor 134 shown is suitable for detecting and storing the fingerprint of a user. The fingerprint sensor 134, like the electronic components 133, is supplied with electrical energy from the first battery 131.

The first thermoplastic covering layer 110 having the transparent portion 111 has a softening temperature T1. The second covering layer 120 has a softening temperature T2. In the exemplary embodiment shown, the softening temperatures T1 and T2 are identical, but this is not the case in all the embodiments according to the invention.

The inner layer 140, which comprises the six inner layer plies 141, 142, 143, 144, 145 and 146, has a uniform softening temperature T3. In other embodiments, the inner layer can comprise a plurality of inner layer plies wherein the individual inner layer plies can have different softening temperatures from one another.

The softening temperature T3 is lower than the softening temperature T1 or T2. For example, the softening temperature T3 can have a value of 140 degrees Celsius. The softening temperatures T1 and T2 can, for example, each have a value of between 160 and 220 degrees Celsius.

If the polymer composite device 100 is heated above the softening temperature T3, the inner layer 140 softens or liquefies, wherein the first and the second covering layer 110, 120 remain dimensionally stable at least until the polymer composite device 100 is heated to the temperature T1 or T2. As a result, a flat surface of the polymer composite device 100 is obtained, even during heating of the polymer composite device 100 above the softening temperature T3.

If, in addition to heating of the polymer composite device 100, a pressing force is exerted on the first and/or the second covering layer 110, 120, the inner layer 140 molds around/flows around/encloses the carrier layer 130 and the elements arranged thereon in a material-bonding manner, so that no voids remain inside the polymer composite device 100.

The embodiment shown in FIG. 1 of the polymer composite device 100 additionally comprises a first overheat protection 137 and a second overheat protection 138, which are manufactured from a transparent polymer material. The softening temperatures of the first and of the second overheat protection 137, 138 are higher than the temperature T3. During heating of the polymer composite device 100 above the softening temperature T3, both the first and the second overheat protection 137, 138 remain dimensionally stable. The first overheat protection 137 is arranged on the surface of the first battery 131 and of the display device that faces towards the first covering layer 110. The second overheat protection 138 is arranged on the surface of the first battery 131 and of the display device that faces towards the second covering layer 120.

During heating of the polymer composite device 100, the first overheat protection 137 and the second overheat protection 138 protect temperature-sensitive electronic components of the polymer composite device 100 by absorbing part of the supplied heat and delaying heating of the components.

An advantage of the polymer composite device 100 is that no additional filling or adhesive material has to be introduced into the polymer composite device in order to fix the carrier layer which is uneven in cross-section. As a result, temperature management during manufacture is considerably simplified, so that the total manufacturing time can also be reduced. Temperature- and/or pressure-sensitive electronic components in particular are thereby protected. The temperature-sensitive components nearest to the two covering layers are additionally protected by the use of an overheat protection.

Figure 2:
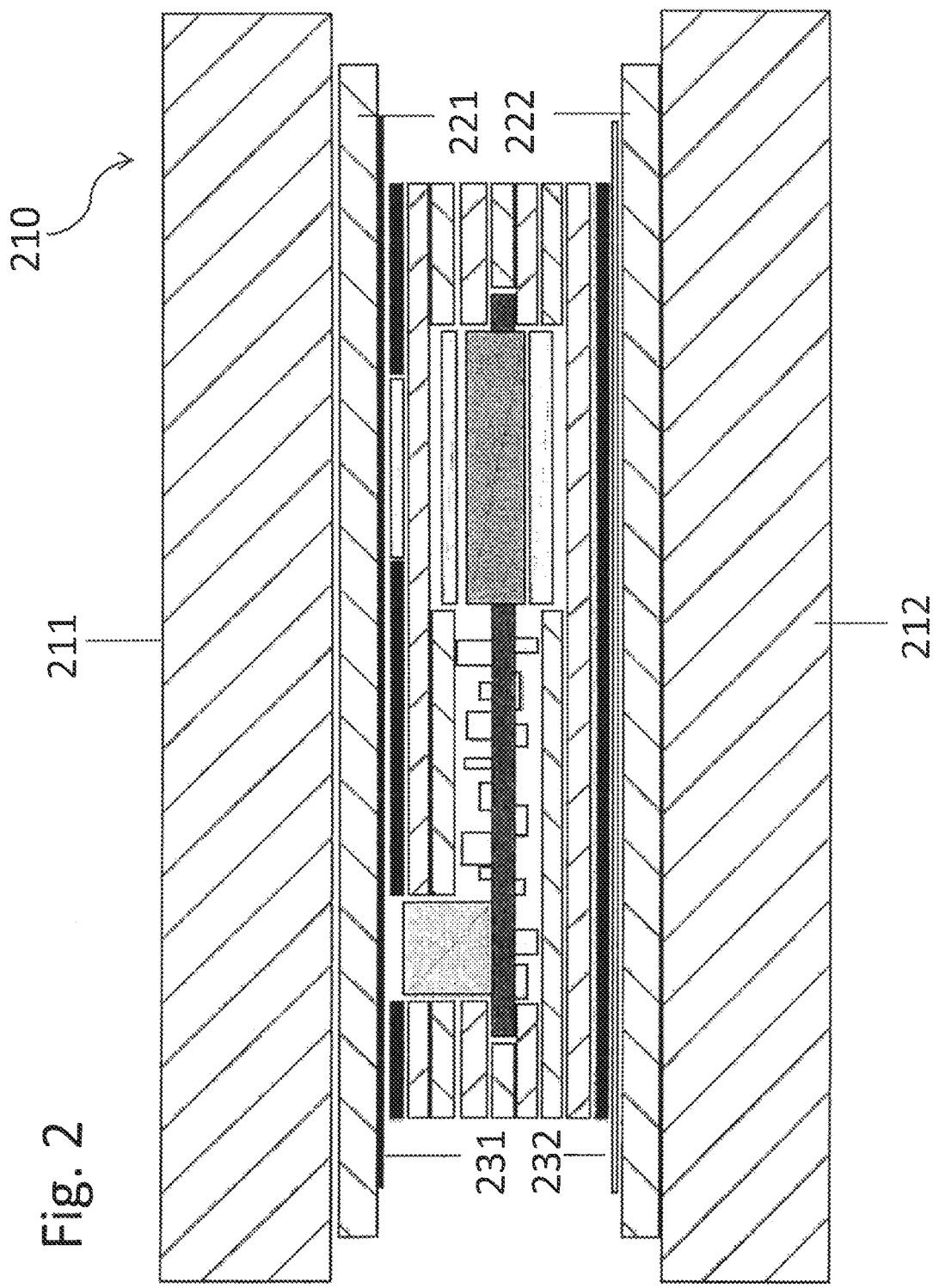
FIG. 2 shows, schematically, a polymer composite device with enclosed components in a laminating device.

FIG. 2 shows, schematically, a thermal press 210 which is suitable for heating a polymer composite device 100 and applying a pressing force thereto. The thermal press 210 comprises a first pressing plate 211 and a second pressing plate 212. The first pressing plate 211 and the second pressing plate 212 are oriented parallel to one another and together define an interior space. A first laminating plate 221 lies against the surface of the first pressing plate 211 that faces towards the second pressing plate 212. A second laminating plate 222 lies against the surface of the second pressing plate 212 that faces towards the first pressing plate 211.

In the exemplary embodiment shown in FIG. 2, an insulating inlay in the form of a first Teflon film 231 lies against the surface of the first laminating plate 221 that faces towards the second pressing plate 212. An insulating inlay in the form of a second Teflon film 232 lies against the surface of the second laminating plate 222 that faces towards the first pressing plate 211.

The insulating inlays assist with uniform heat transfer to the polymer composite device to be heated, and thus contribute towards obtaining the flat surfaces of the polymer composite device during exertion of the pressing force.

The polymer composite device 100 to be manufactured is arranged between the first and the second Teflon films 231, 232.

In the exemplary embodiment shown in FIG. 2, the first pressing plate 211 is arranged and configured to exert a pressing force on the polymer composite device 100 by being displaced in the direction towards the second pressing plate 212 in a manner effective for pressing.

Both the first and the second pressing plate 211, 212 are configured and arranged to be warmed/heated by a heating device (not shown). The heat supplied to the pressing plates 211, 212 is first transferred to the laminating plates 221, 222. The laminating plates 221, 222 warm the first and second Teflon film 222, 232, respectively, wherein the Teflon films delay the transmission of the heat to the polymer composite device 100 arranged in the thermal press. When the delay has passed, the heat is transmitted to the polymer composite device 100 with a uniformly increasing temperature.

The thermal press 210 is configured and arranged to heat the polymer composite device 100 to a manufacturing temperature TF, wherein the manufacturing temperature TF is higher than the softening temperature T3 and lower than the softening temperature T1 or T2. The thermal press 210 is configured and arranged to exert a pressing force on the polymer composite device 100 at the same time as it heats the polymer composite device 100.

The thermal press 210 is further configured and arranged to end heating of the layers pressed into contact after a predetermined period of time, preferably of 60 seconds, particularly preferably of 30 seconds.

FIG. 3 and FIG. 4 show a laminating device 200, which comprises a first thermal press 210 and a second thermal press 240 as well as a transport device 400. The second thermal press 240 corresponds in construction to the thermal press 210 shown in FIG. 2. The second thermal press 240 is further arranged and configured to cool a polymer composite device 100 by means of a cooling device (not shown) and at the same time to exert a pressing force on the polymer composite device 100.

Optionally, a vacuum can be generated in the region of the first and/or second thermal press, in particular in the interior space of the first and/or second thermal press, during heating and/or cooling of the polymer composite device.

A transport device 400 conveys a plurality of polymer composite devices in succession into the interior spaces of the thermal presses 210, 240 or out of the interior spaces of the thermal presses. The polymer composite devices are thereby each in an arrangement of two laminating plates and two Teflon films. The arrangements correspond in each case to the arrangement shown in FIG. 1.

The transport device 400 comprises two revolving belts 410, 420, which in particular are movable independently of one another, which are suitable for moving the polymer composite device, or the arrangements, in a conveying direction X. The revolving belts 410, 420 are guided via the drive rollers 430. The revolving belts 410, 420 are configured and arranged to be lowered into depressions 213, 214 provided therefor before or during the displacement, in a manner effective for pressing, of the first pressing plates of the thermal presses 210, 240.

In other words, the revolving belts 410, 420 are movable in a direction Y, which extends substantially orthogonally to the conveying direction X. The revolving belts 410, 420 can be positioned into the depressions 213, 214 of the thermal presses 210, 240.

If the revolving belts 410, 420 are lowered, the conveyed arrangements, in which the polymer composite devices to be manufactured are received, lose direct contact with the revolving belts and lie against a surface of the respective thermal press. The revolving belts 410, 420 are further configured and arranged to be moved out of the depressions 213, 214, after a pressing force has been released, so that contact between the revolving belts and the polymer composite devices is re-established and successive conveying in the conveying direction X can be continued.

Lowering of the revolving belts 410, 420 can be effected, for example, by lowering the drive rollers 430.

In a further development (not shown), the first and/or the second thermal press can each have its own transport device, each of which has its own drive. The transport devices can interengage in a transfer region. In particular, parallel revolving belts of the transport devices can be at different distances from one another, so that interengagement of the transport devices is made possible. Operation of the transport devices independently of one another is possible.

FIG. 5 shows, schematically, the execution of an authentication process which can be carried out, for example, by means of a polymer composite device.

The authentication method is suitable, for example, for enabling user-individual control authorizations of a data processing device, in particular within the context of banking transactions.

Firstly, there are to be provided for this purpose a data processing device, for example a home computer, a PC tablet or other mobile terminal, and a suitable application program product which controls the data processing device according to the process steps described hereinbelow.

The data processing device to be provided comprises a display device, for example a home computer flat screen. Furthermore, the data processing device to be provided is electronically connected to a central controller, for example a bank server, so that the data processing device and the central controller are able to exchange information. In a variant, the exchange of information can take place wirelessly.

S01: The data processing device with the application program product is started up. This can be carried out in particular by a user.

S02: In order to obtain access to user-specific information, for example to account data or personal data, a user of the data processing device authenticates himself with a first authentication code. This first authentication code is preferably known only to the user himself or to a specific group of people and in particular allows user-specific information to be viewed and predetermined control authorizations to be enabled. The first authentication code can in particular be a multi-digit decimal number, for example a PIN (personal identification number).

S03: Predetermined control authorizations which are accessible only to the user or a specific group of people, for example financial transactions, require a second authentication with a second user-individual authentication code. A higher degree of security/integrity of the controls authorized by the user is thus ensured.

In the case of an attempt to access the predetermined control authorizations, the central controller connected to the data processing device determines a QR code (quick response code) on the basis of the first authentication code already been inputted and with time information.

The construction and representation of QR codes are known as prior art and are not described in greater detail here. Alternatively, other optically recognizable symbols can also be used.

The determined QR code is displayed by the display device of the data processing device which is connected to the central controller.

The QR code contains the second authentication code in an encrypted form, so that access to the second authentication code, in addition to requiring conversion of the QR code into binary data information, also requires decryption. The second authentication code can in particular be a multi-digit decimal number, for example a so-called TAN (transaction number).

S04: For reading the QR code and for decrypting the second authentication code, an identification means that is independent of the data processing device is necessary. In the process described here, this identification means is an identification card having an optical sensor, which is suitable in particular for detecting QR codes, a fingerprint sensor, an electronic circuit, which is adapted for executing a decrypting function, and a card display device, which is suitable for displaying the second authentication code. The identification card is a polymer composite device.

The identification card is started up by the user by means of an on/off button. If the on/off button is not operated again by the user for a predetermined period of time, for example 10 minutes, the identification card switches into a standby mode in order to save energy, in which in particular the card display device, the optical sensor and the fingerprint sensor are deactivated.

S05: The user places a finger on the fingerprint sensor of the identification card, and the fingerprint sensor detects a fingerprint of the user. Detection of the fingerprint makes it difficult for unauthorized third parties to misuse the identification card.

S06: The identification card compares the detected fingerprint of the user with stored fingerprint information of an identification card holder. If the fingerprint information matches, the optical sensor and a decrypting function of the identification card are activated. If the fingerprint information does not match, the optical sensor and the decrypting function are not activated.

S07: For converting the QR code into binary data information and for decrypting the binary data information, the identification card is positioned at the display device of the data processing device, so that the activated optical sensor detects the QR code.

S08: The electronic circuit of the identification card decrypts the detected information and determines the second authentication code. Furthermore, the second authentication code is displayed/outputted by the card display device.

S09: The user inputs the displayed second authentication code into the data processing device.

After the second authentication code has been inputted into the data processing device, the user-individual control authorization is enabled.

If the second authentication code inputted is incorrect, the user is denied the control authorization. It is possible to carry out the authentication process or individual steps of the authentication process again. In a further development (not shown), after repeated incorrect inputting of the first or the second authentication code, predetermined control authorizations are blocked by the data processing device and it is not possible to repeat the authentication process.

It should be noted that, although numerical ranges and numerical values have been disclosed herein, all numerical values between the disclosed values and any numerical sub-range within the mentioned ranges are likewise to be regarded as disclosed.

The above-described variants of the device and the structural and operational aspects thereof serve merely for better understanding of their structure, functioning and properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described procedure. Combinations between all the individual implementations in the text, that is to say in every section of the description, in the claims, and also combinations between different variants in the text, in the claims and in the figures, are also included. The claims also do not limit the disclosure and thus the possible combinations of all the indicated features with one another. All the disclosed features are explicitly also disclosed herein individually and in combination with all the other features.

The invention claimed is:

1. A polymer composite device in card form, comprising:
   a first thermoplastic covering layer of a polymer material with a first softening temperature,
   a second thermoplastic covering layer of a polymer material with a second softening temperature,
   a carrier layer which is arranged between the first covering layer and the second covering layer,
   an inner layer which is formed of at least a first thermoplastic inner layer ply of a polymer material with a third softening temperature and is arranged between the first covering layer and the second covering layer, wherein
   the inner layer at least partially surrounds the carrier layer in a material-bonding manner,
   the third softening temperature is lower than the first softening temperature and lower than the second softening temperature.

2. The polymer composite device as claimed in claim 1, further comprising:
   at least one display device, wherein
   the at least one display device is arranged between the first covering layer and the second covering layer, in particular on the carrier layer,
   the first covering layer and/or the second covering layer include, in particular in the region of the display device, at least one partially transparent portion, so that at least part of the at least one display device is optically recognizable/readable for an observer and/or an electronic reader, and/or
   the first inner layer ply is at least partially transparent at least in the region of the display device.

3. The polymer composite device as claimed in claim 2, further comprising:
   a first, in particular rechargeable, battery, and
   a first overheat protection which in particular comprises a polymer material whose softening temperature is higher than the third softening temperature, and/or
   a second overheat protection which in particular comprises a polymer material whose softening temperature is higher than the third softening temperature, wherein
   the first overheat protection is arranged between the display device and/or the first battery and the first covering layer, in particular lying against a surface of the display device and/or of the first battery that faces towards the first covering layer, and/or
   the second overheat protection is arranged between the display device and/or the first battery and the second covering layer, in particular lying against a surface of the display device and/or of the first battery that faces towards the second covering layer.

4. The polymer composite device as claimed in claim 3, further comprising:
   a second, in particular rechargeable, battery, and/or
   electronic components, in particular semiconductor components, arranged in particular on the carrier layer, which form an electronic circuit, and/or
   at least one fingerprint sensor which is arranged and configured to detect and/or to store a fingerprint, and/or at least one induction coil which is electrically conductively connected to the first and/or the second battery, and/or at least two connection contacts which are electrically conductively connected to the first and/or the second battery, wherein the first and/or second battery can be charged by an electric current which is brought about by applying a voltage to the connection contacts and/or by inductive energy transfer to the induction coil.

5. The polymer composite device as claimed in claim 4, further comprising:

at least one on/off button which is preferably surrounded by an in particular annular spacer element, wherein the at least one on/off button and/or the spacer element is/are arranged between the first covering layer and the second covering layer, in particular on the carrier layer, and/or the on/off button is configured for starting and/or ending operation of the electronic circuit and/or of the display device, and/or the spacer element protrudes beyond the on/off button in the direction from the second covering layer to the first covering layer or in the direction from the first covering layer to the second covering layer.

6. The polymer composite device as claimed in claim 4, further comprising:

an optical sensor which is arranged and configured to detect an optically recognizable symbol, in particular a QR code, wherein the optical sensor and/or the electronic circuit is/are arranged and configured to compare the detected optically recognizable symbols with stored information and/or to electronically process them, and/or the optical sensor and/or the electronic circuit is/are arranged and configured to transmit the detected optically recognizable symbols and/or information determined on the basis of the detected optically recognizable symbols to the display device, and/or the optical sensor is positioned on the side of the carrier layer that faces away from the display device.

7. The polymer composite device as claimed in claim 1, wherein the inner layer further comprises:

a second thermoplastic, in particular transparent, inner layer ply, wherein the softening temperature of the second thermoplastic inner layer ply is the same as or lower than the third softening temperature, and/or a third thermoplastic, in particular transparent, inner layer ply, wherein the softening temperature of the third thermoplastic inner layer ply is the same as or lower than the third softening temperature, and/or a fourth thermoplastic, in particular transparent, inner layer ply, wherein the softening temperature of the fourth thermoplastic inner layer ply is the same as or lower than the third softening temperature, and/or a fifth thermoplastic, in particular transparent, inner layer ply, wherein the softening temperature of the fifth thermoplastic inner layer ply is the same as or lower than the third softening temperature, and/or a sixth thermoplastic, in particular transparent, inner layer ply, wherein the softening temperature of the sixth thermoplastic inner layer ply is the same as or lower than the third softening temperature.

8. A laminating device suitable for producing the polymer composite device as claimed in claim 1, comprising:

at least a first thermal press which comprises a first heatable pressing plate and a second heatable pressing plate which are oriented parallel to one another and together define an interior space, a first laminating plate which lies against the surface of the first pressing plate that faces towards the second pressing plate, a second laminating plate which lies against the surface of the second pressing plate that faces towards the first pressing plate, a first insulating inlay which lies against the surface of the first laminating plate that faces towards the second pressing plate, and a second insulating inlay which lies against the surface of the second laminating plate that faces towards the first pressing plate, wherein at least the first pressing plate is displaceable in the direction towards the second pressing plate in a manner effective for pressing, so that the first insulating inlay and the second insulating inlay can be brought into contact with a workpiece arranged in the interior space, the first laminating plate can be heated by heating the first pressing plate, and the second laminating plate can be heated by heating the second pressing plate, and the first insulating inlay can be heated in a time-delayed manner by heating the first laminating plate, and the second insulating inlay can be heated in a time-delayed manner by heating the second laminating plate.

9. The laminating device as claimed in claim 8, wherein the first thermal press further comprises:

a first heating device for heating the first pressing plate, and/or a second heating device for heating the second pressing plate, and/or a first cooling device for cooling the first pressing plate, and/or a second cooling device for cooling the second pressing plate.

10. The laminating device as claimed in claim 8, further comprising:

a transport device which is configured and arranged to convey the workpiece to be manufactured into the interior space of the thermal press, and/or to convey the workpiece out of the interior space of the thermal press.

11. The laminating device as claimed in claim 10, wherein the transport device is further configured and arranged:

to move the workpiece to be manufactured in a conveying direction, and/or to be movable in a lowering direction which is orthogonal to the conveying direction.

12. A method for producing a polymer composite device in card form, comprising the steps:

providing a first thermoplastic covering layer of a polymer material with a first softening temperature, providing a second thermoplastic covering layer of a polymer material with a second softening temperature, providing a carrier layer, providing an inner layer which is formed of at least a first thermoplastic inner layer ply of a polymer material with a third softening temperature, wherein the third softening temperature is lower than the first softening temperature and lower than the second softening temperature, arranging the carrier layer and the inner layer between the first covering layer and the second covering layer, wherein the inner layer at least partially surrounds the carrier layer, exerting a pressing force on at least one of the covering layers, so that the first covering layer and the second covering layer are pressed at least partially into contact with the inner layer, heating the covering and carrier layers pressed into contact to a manufacturing temperature, wherein the manufacturing temperature is at least equal to the third softening temperature, the manufacturing temperature is lower than the first softening temperature, and the manufacturing temperature is lower than the second softening temperature.

13. The method for producing a polymer composite device as claimed in claim 12, further comprising at least one of the steps:

arranging a display device and/or a first battery between the first covering layer and the second covering layer, in particular on the carrier layer, arranging the first overheat protection between the display device and/or the first battery and the first covering layer, in particular lying against a surface of the display device and/or of the first battery that faces towards the first covering layer, arranging the second overheat protection between the display device and/or the first battery and the second covering layer, in particular lying against a surface of the display device and/or of the first battery that faces towards the second covering layer, cooling the layers to a temperature which is lower than the third softening temperature, and releasing the pressing force.

14. The method for producing a polymer composite device as claimed in claim 12, wherein prior to the method steps, electronic components, in particular semiconductor components, are arranged on the carrier layer, in particular by a printing process.

15. The method for producing a polymer composite device as claimed in claim 12, wherein heating of the layers pressed into contact is ended after a predetermined period of time, preferably of 60 seconds, particularly preferably of 30 seconds.

* * * * *